US009643369B2

(12) United States Patent
Takemura et al.

(10) Patent No.: US 9,643,369 B2
(45) Date of Patent: May 9, 2017

(54) METALLIC MOLD STRUCTURE, TRANSFER MOLDING APPARATUS, TRANSFER MOLDING METHOD, AND OPTICAL MEMBER FORMING APPARATUS

(71) Applicant: OMRON Corporation, Kyoto-shi, Kyoto (JP)

(72) Inventors: Koichi Takemura, Saitama (JP); Tomofusa Shibata, Saitama (JP); Yoshinori Ito, Saitama (JP); Yoshikaga Taguchi, Shiga (JP); Yoshihisa Yamanaka, Saitama (JP); Kenji Suzuki, Saitama (JP); Kazutaka Kaneko, Saitama (JP); Masayuki Kojima, Saitama (JP); Yuzuru Fujie, Saitama (JP); Naoki Hashimoto, Saitama (JP); Taichi Suzuki, Saitama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/310,308

(22) Filed: Jun. 20, 2014

(65) Prior Publication Data

US 2015/0021797 A1 Jan. 22, 2015

(30) Foreign Application Priority Data

Jul. 22, 2013 (JP) .................................. 2013-151764

(51) Int. Cl.
*B29C 43/46* (2006.01)
*B29D 11/00* (2006.01)
(Continued)

(52) U.S. Cl.
CPC ........ *B29D 11/00663* (2013.01); *B29C 43/04* (2013.01); *B29D 11/00288* (2013.01);
(Continued)

(58) Field of Classification Search
CPC .................. B29D 11/00288; B29L 2011/0075
See application file for complete search history.

(56) References Cited

U.S. PATENT DOCUMENTS 3,256,376 A * 6/1966 Leedy ..................... B29C 51/22
264/151
4,888,145 A 12/1989 Allner et al.
(Continued)

FOREIGN PATENT DOCUMENTS

JP  S59-78811 A   5/1984
JP  H02-106322 A  4/1990
(Continued)

OTHER PUBLICATIONS

Office Action in counterpart Japanese Patent Application No. 2013-151764 issued on Jan. 24, 2017 (8 pages).

*Primary Examiner* — Jill Heitbrink
(74) *Attorney, Agent, or Firm* — Osha Liang LLP (57) ABSTRACT

A transfer molding method includes supplying melted resin to a first metallic mold, conveying the first metallic mold onto which the resin was supplied to a position opposing a second metallic mold, performing transfer molding by sandwiching the resin between the two metallic molds, and cooling the resin after performing transfer molding. The performing transfer molding includes discharging residual air that remains in a recess via a groove portion.

12 Claims, 6 Drawing Sheets

(51) Int. Cl.
*B29C 43/04* (2006.01)
*B29C 43/02* (2006.01)
(52) U.S. Cl.
CPC .. *B29C 2043/025* (2013.01); *B29C 2043/046* (2013.01); *B29C 2043/463* (2013.01)

(56) References Cited

U.S. PATENT DOCUMENTS

| | | | | |
|---|---|---|---|---|
| 6,902,389 | B2* | 6/2005 | Gorman | A44B 18/0049 425/363 |
| 2004/0053008 | A1* | 3/2004 | Kim | B32B 3/00 428/167 |
| 2008/0145470 | A1* | 6/2008 | Ausen | B29C 33/424 425/363 |
| 2010/0109185 | A1* | 5/2010 | Ogawa | B29C 43/222 264/177.19 |
| 2011/0129956 | A1* | 6/2011 | Polito | B29C 43/021 438/71 |
| 2012/0041337 | A1* | 2/2012 | Ferguson | A61M 37/0015 600/573 |

FOREIGN PATENT DOCUMENTS

| | | |
|---|---|---|
| JP | 2005-310286 A | 11/2005 |
| JP | 2007-136842 A | 6/2007 |
| JP | 2011-104999 A | 6/2011 |

\* cited by examiner

| Groove width (mm) | 0 | 0.5 | 1 | 1.5 |
|---|---|---|---|---|
| Large air bubbles | × | ○ | ○ | ○ |
| Small air bubbles | ○ | ○ | × | × |

METALLIC MOLD STRUCTURE, TRANSFER MOLDING APPARATUS, TRANSFER MOLDING METHOD, AND OPTICAL MEMBER FORMING APPARATUS

FIELD

The present invention relates to a metallic mold structure, a transfer molding apparatus, a transfer molding method, and an optical member forming apparatus.

BACKGROUND

Conventionally, there have been metallic molds for performing transfer molding of fine relief patterns by heating and pressing resin film between a first mold and a second mold using a transfer plate, as disclosed in JP 2005-310286A.

However, in the conventional metallic mold structure disclosed in JP 2005-310286A, there is no mention of a method for removing air bubbles formed in the transfer molding.

JP 2005-310286A is an example of background art.

SUMMARY

According to one or more embodiments of the present invention, air bubbles that are generated in transfer molding can be effectively removed.

According to one or more embodiments of the present invention, a metallic mold structure comprises a transfer molding unit that performs transfer molding on front and rear surfaces of resin that has been melted and supplied. The transfer molding unit includes a first transfer member that performs transfer molding on the front surface of the resin; and a second transfer member that performs transfer molding on the rear surface of the resin. One of the transfer members includes: a recess formed on a transfer face; and at least one groove portion that is connected to the recess.

According to this configuration, transfer molding is performed by the transfer members on the front and rear surfaces of resin that is already in a melted state, and therefore it is possible to shorten the amount of molding time. Also, since groove portions that are connected to a recess are formed, air bubbles that are formed in the recess can be removed via the groove portions.

According to one or more embodiments of the present invention, the groove portion has a depth that is greater than or equal to the depth of the recess.

According to this configuration, air bubbles that are generated in the recess can be discharged smoothly via a groove portion without a level difference, or a groove portion that is deeper.

According to one or more embodiments of the present invention, the transfer member has a supplementary groove portion that is formed along the recess so as to be in communication therewith, and the groove portion is connected to the recess via the supplementary groove portion.

According to this configuration, air bubbles discharged from the recess are temporarily accumulated in the supplementary groove portion and can be discharged even more smoothly via the groove portion.

According to one or more embodiments of the present invention, the first transfer member is constituted by a first transfer roller that can be driven so as to rotate and is arranged at a predetermined interval from a guide roller, and the second transfer member is constituted by a second transfer roller that is arranged at a predetermined interval from the first transfer roller and can be driven so as to rotate.

According to this configuration, when the resin passes between the guide roller and the first transfer roller, transfer molding can be performed on one face of the resin by the first transfer roller, and when the resin passes between the first transfer roller and the second transfer roller, transfer molding can be performed on the other face of the resin by the second transfer roller. According to this, transfer molding can be performed successively, and efficient transfer molding can be realized.

According to one or more embodiments of the present invention, one of the transfer members is constituted by a first metallic mold that can be conveyed and receives a supply of the resin, and the remaining other transfer member is constituted by a second metallic mold that separatably opposes the first metallic mold that is conveyed so as to be positioned at a predetermined position.

According to this configuration, by merely supplying the melted resin directly onto the first metallic mold and moving the first metallic mold so as to be joined to the second metallic mold, a mold product can be easily obtained.

According to one or more embodiments of the present invention, the groove portion is in communication with the exterior of the metallic mold.

According to this configuration, air bubbles that are formed in the recess can be guided to the exterior via the groove portion and air bubbles can thus be removed even more smoothly.

According to one or more embodiments of the present invention, a transfer molding apparatus includes one of the above-described metallic mold structures.

One or more embodiments of the present invention includes a material supply apparatus that melts and supplies resin; a transfer molding apparatus including a metallic mold structure that has the first metallic mold and the second metallic mold; and a conveyance member that causes one of the transfer members of the transfer molding apparatus to move between a position at which melted resin supplied from the material supply apparatus can be received, and a position at which transfer molding can be performed in cooperation with the remaining other transfer member.

According to one or more embodiments of the present invention, a transfer molding method comprises: a step of supplying melted resin to a first metallic mold; a step of conveying the first metallic mold onto which the resin was supplied to a position opposing a second metallic mold; a step of performing transfer molding by sandwiching the resin between the two metallic molds; and a step of cooling the resin after performing transfer molding. In the step of performing transfer molding, residual air that remains in a recess is discharged via a groove portion.

According to one or more embodiments of the present invention, the groove portion has a depth that is greater than or equal to the depth of the recess.

According to one or more embodiments of the present invention, a portion of the melted resin flows out to a groove portion for molding a non-product portion in the step of performing transfer molding.

According to one or more embodiments of the present invention, transfer molding is performed by two transfer members on the surface of the resin that is already in a melted state, and therefore it is possible to shorten the amount of molding time. Also, a groove portion that is continuous with a recess is formed, and therefore air bubbles that are formed in the groove portion can be removed via the groove portion.

BRIEF DESCRIPTION OF THE DRAWINGS

FIG. 2A is a development plan, FIG. 2B is a side view.

DETAILED DESCRIPTION

Embodiments of the present invention will be described below with reference to the accompanying drawings. Note that in the description below, terms indicating specific positions and directions (e.g., terms including "up", "down", "side", and "end") are used as necessary in order to facilitate understanding of the invention as indicated in the drawings and are not intended to limit the technical scope of the invention according to their respective meanings. Also, the description below is merely an example and is not intended to limit the present invention, its application, or its use. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
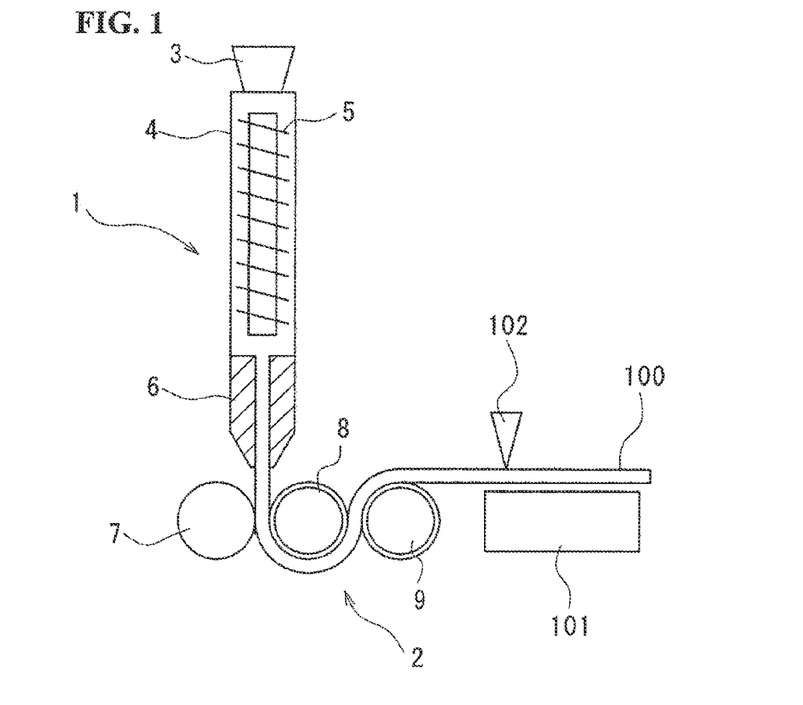
FIG. 1 is a schematic diagram for describing an optical member forming apparatus according to a first embodiment.

FIG. 1 shows an illustration of an optical member forming apparatus according to a first embodiment. The optical member forming apparatus includes a material supply apparatus 1 that extrudes melted resin in the form of a sheet, and a transfer molding apparatus 2 that performs transfer molding on the front and rear surfaces of extruded sheet-shaped resin 100.

The material supply apparatus 1 melts pellet-shaped resin material that has been introduced via a hopper 3 provided on the upper portion thereof, while conveying the resin material downward by means of a screw 5 that is rotatably provided in a main body 4. Then, the resin material is extruded from the die exit of a T-die 6 provided at the lower end. The die exit has a long slit shape that extends in a horizontal direction that is perpendicular to the conveyance direction of a lower mold 30 (shown in FIG. 4). A gap in the width direction of the die exit and the amount of resin supplied from the T-die 6 can be freely adjusted.

The transfer molding apparatus 2 is constituted by a guide roller 7 and a pair of transfer rollers (a first transfer roller 8 and a second transfer roller 9). The rollers are arranged at a predetermined interval in the horizontal direction. The guide roller 7 and the first transfer roller 8 are arranged below the T-die 6 and press against the two faces of the sheet-shaped resin that is supplied vertically downward from the die exit.

Figure 2A:
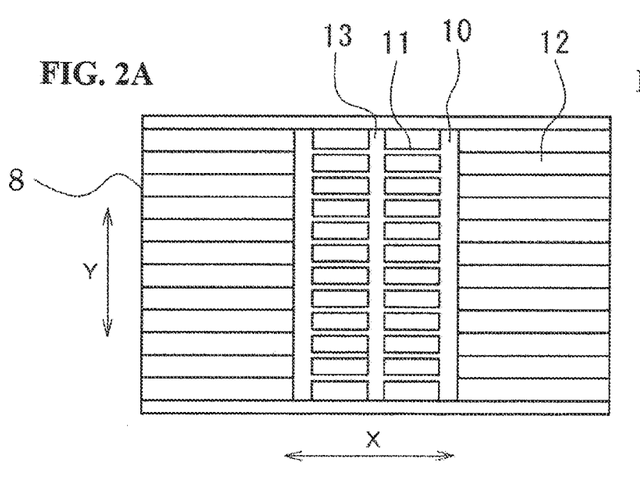
Figure 2B:
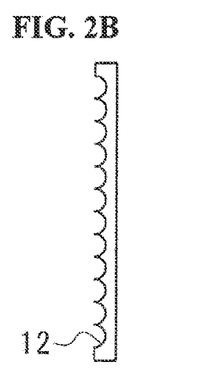
Figure 2C:
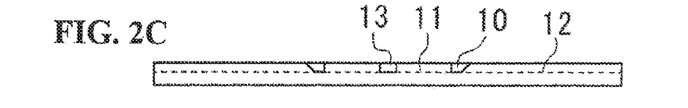
FIG. 2C is a front view of a first transfer roller in FIG. 1.

As shown in the development plan in FIG. 2A, a recess 10 that extends in the width direction, multiple first groove portions 11 that extend from the recess 10 in one orthogonal circumferential direction, and multiple second groove portions that extend in the opposite circumferential direction are formed on the surface of the first transfer roller 8 (shown in FIG. 1). The recesses 10, the first groove portions 11, and the second groove portions 12 are arranged so as to be linearly symmetrical. That is to say, the recesses 10 are arranged with a predetermined interval in the circumferential direction, the first groove portions 11 extend from the recesses 10 in opposing directions, and the second groove portions 12 extend in the directions opposite thereto. Also, the first groove portions 11 are in communication with a communication groove 13 that extends in the width direction between the recesses 10.

Figure 3:
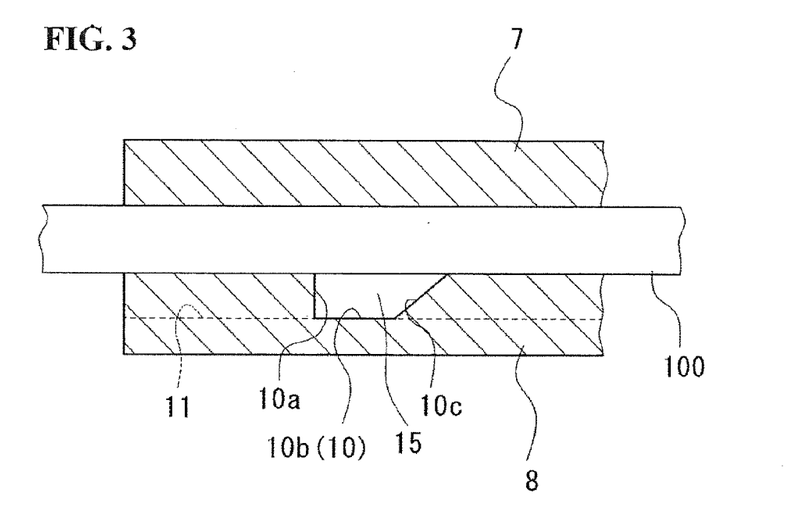
FIG. 3 is a partially enlarged view of a recess in FIG. 2.

As shown in FIG. 3, the recess 10 is a space surrounded by a vertical face 10a, a bottom face 10b, an inclined face 10c, and two end faces (not shown). Multiple arc-shaped regions 14 are aligned in the width direction on the inclined face 10c, and many protruding portions that are roughly triangular in cross-section extend in the radial direction on the lower halves of the arc-shaped regions 14.

A portion of the melted resin flows into the recess 10 and forms a thick portion 15. The height dimension of the thick portion 15 is formed so as to be in the order of less than a millimeter (here, 0.5 mm). The protrusion dimension (surface roughness) of the protruding portions formed on the inclined face is formed so as to be in the order of microns to less than a micron (here, 2 μm). Regions in which the protruding portions are formed are also included on the transfer face and bend light received from the multiple light sources arranged on the end face side of the thick portion 15 in order to prevent light leakage from the inclined face 10c.

The first groove portions 11 are formed so as to be positioned between the arc-shaped regions 14 and function as gas discharging grooves. The depth dimension of the first groove portions 11 is set to be greater than or equal to the depth dimension of the recess 10 (here, they are set to the same depth). Also, the width dimension of the first groove portions 11 is set to a value at which no air bubbles remain in the recess 10 while the outflow amount of the melted resin that flows into the recess 10 is suppressed to the minimum necessary amount.

The second groove portions 12 have a cross-section that is approximately semi-circular and form multiple protrusions 16 that have an arc-shaped cross-section and are continuous with the thick portion 15 in a state of being aligned in the width direction on the surface of the mold product.

Multiple semi-spherical small protruding portions having a depth in the order of microns to less than a micron are arranged at an arbitrary interval in the width direction and in the circumferential direction on a transfer face that is formed on the second transfer roller 9. According to this, multiple semi-spherical small recessed portions can be formed on the upper face of the resin that is the transfer destination. The face on which the small recessed portions are formed is a reflection face that has a function of emitting light by causing light from the light sources to be reflected toward the upper face side. Note that the small protruding portions are not limited to being semi-spherical, and for example, various shapes such as a shape that is triangular in cross-section are possible. Furthermore, small recessed portions may be formed rather than small protruding portions.

Operation

Operations performed by the transfer molding apparatus 2 with the above-described configuration will be described next.

Resin pellets are supplied into the main body 4 of the material supply apparatus 1 via the hopper 3, and the supplied resin pellets are melted while the internal screw 5 is caused to rotate. Then, the melted resin is supplied to the transfer molding apparatus 2 in the form of a sheet from the die exit of the T-die 6.

In the transfer molding apparatus 2, the supplied sheet-shaped resin first passes between the guide roller 7 and the first transfer roller 8. At this time, the pattern of the first transfer roller 8, or in other words, the thick portion 15 and the protrusions 16 are formed by the recess 10 and the second groove portions 12 respectively on one face of the sheet-shaped resin. At this time, air bubbles are sometimes formed mainly in the recess 10, and the air bubbles are discharged via the first groove portions 11 as the first transfer roller 8 rotates. Accordingly, defects such as voids being formed in the sheet-shaped resin or burning and the like do not occur.

Note that after the transfer molding, the sheet-shaped resin is conveyed onto a support base 101 where an optical member (here, a light guide plate) is formed by using a cutter 102 to cut the resin so as to be a predetermined length.

With the first embodiment, the arrangement pattern of the recess 10, the first groove portions 11, the second groove portions 12, and the communication groove 13 is formed so as to be linearly symmetrical with respect to the center of the communication groove 13 in the development plan, but it is also possible to form the arrangement pattern such that the constituent elements are continuous in the circumferential direction. In such a case, the recess 10 and the second groove portions 12 are arranged continuously, and the need for the first groove portions 11 that act as gas discharging grooves can be eliminated.

Second Embodiment

Figure 4:
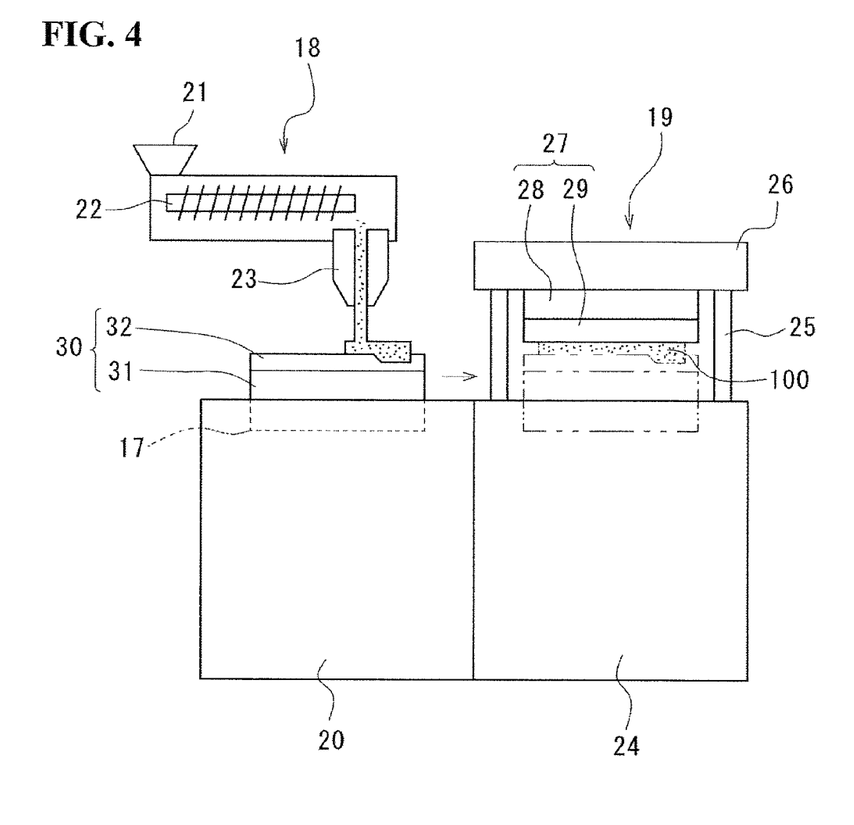
FIG. 4 is a schematic diagram for describing an optical member forming apparatus according to a second embodiment.

FIG. 4 shows an illustration of an optical member forming apparatus according to a second embodiment. The optical member forming apparatus includes a conveyance member 17 that conveys a later-described lower mold 30, a material supply apparatus 18 that supplies material to the lower mold 30, and a transfer molding apparatus 19 that performs transfer molding on the supplied material so as to form an optical member.

The conveyance member 17 is for conveying the lower mold 30 between a first lower support base 20 of the material supply apparatus and a second lower support base 24 of the transfer molding apparatus 19 that is arranged so as to be continuous with the first lower support base 20. The conveyance member 17 is constituted by a support base that supports the lower mold 30 and by a conveyance mechanism (solenoid, actuator, stepping motor, or the like) for conveying the support base, although these are not shown in the figure. Regarding the conveyance position achieved by the conveyance mechanism, the position of the lower mold 30 that is placed on the support base is detected using a sensor, a camera, or the like, and the lower mold 30 can be accurately positioned with respect to the material supply apparatus 1 and the transfer molding apparatus 2.

The material supply apparatus 1 is arranged above the first lower support base 20 and causes the pellets introduced from a hopper 21 to melt while conveying them using the internal screw 22. Then, the obtained melted resin is supplied from the die exit of the T-die 23 to the lower mold 30 that is conveyed by the conveyance member 17. Similarly to the first embodiment, the die exit has a long slit shape that extends in a horizontal direction that is perpendicular to the conveyance direction of a lower mold 30. The gap in the width direction of the die exit (conveyance direction of the lower mold 30) and the amount of resin supplied from the T-die 23 can be adjusted freely. The melted resin is supplied in the form of a sheet from the T-die 23 to the transfer molding apparatus 2 while the lower mold 30 is conveyed by the conveyance member 17. Note that the melted resin to be supplied is ideally in the form of sheet, but the later-described transfer molding can be performed when the melted resin is in another form as well. For example, transfer molding is possible in the case where the melted resin is supplied in a bar shape with a rectangular cross-section or an elliptical cross-section.

The transfer molding apparatus 19 includes struts 25 that can move up and down in the four corners of the second lower support base 24 and an elevating plate 26 is integrated on the upper portions of the struts 25. An upper mold 27 is attached to the lower face of the elevating plate 26. The upper mold 27 is composed of an upper mold heating head 28 and an upper mold transfer plate 29 that is fixed to the lower face of the upper mold 27. The upper mold heating head 28 adjusts the temperature of the upper mold transfer plate 29 to a desired temperature.

The upper mold transfer plate 29 is formed by forming nickel-chrome alloy into a plate shape that is rectangular in a plan view, similarly to the lower mold transfer plate 32. A transfer face is formed on the upper mold transfer plate 29, and on the transfer face, multiple semi-spherical small protruding portions are arranged with an arbitrary interval in the x axis direction and the y axis direction. The multiple semi-spherical small protruding portions have a depth that is in the order of microns to less than a micron. According to this, semi-spherical small recessed portions can be formed on the upper face of the resin that is the transfer destination. The face on which the small recessed portions are formed is a reflection face that has a function of causing light from the light sources to be reflected toward the upper face side. Note that the small protruding portions are not limited to being semi-spherical, and for example, various shapes such as a shape that is triangular in cross-section are possible. Furthermore, small recessed portions may be formed rather than small protruding portions.

The lower mold 30 is conveyed to the second lower support base 24 by the conveyance member 17 and is positioned at a predetermined position. The lower mold 30 is formed by arranging a lower mold transfer plate 32 on the upper face of a lower mold heating head 31. The lower mold heating head 31 includes a heater (not shown) and adjusts the temperature of the lower mold transfer plate 32 to a desired temperature.

Figure 5A:
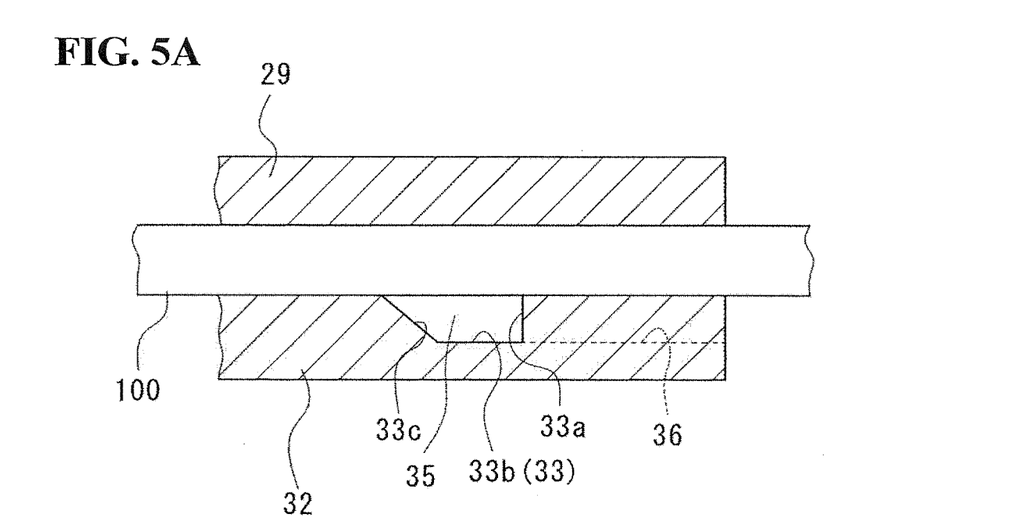
FIG. 5A is a partially enlarged view of a transfer member in FIGS. 1 and 3.
Figure 5B:
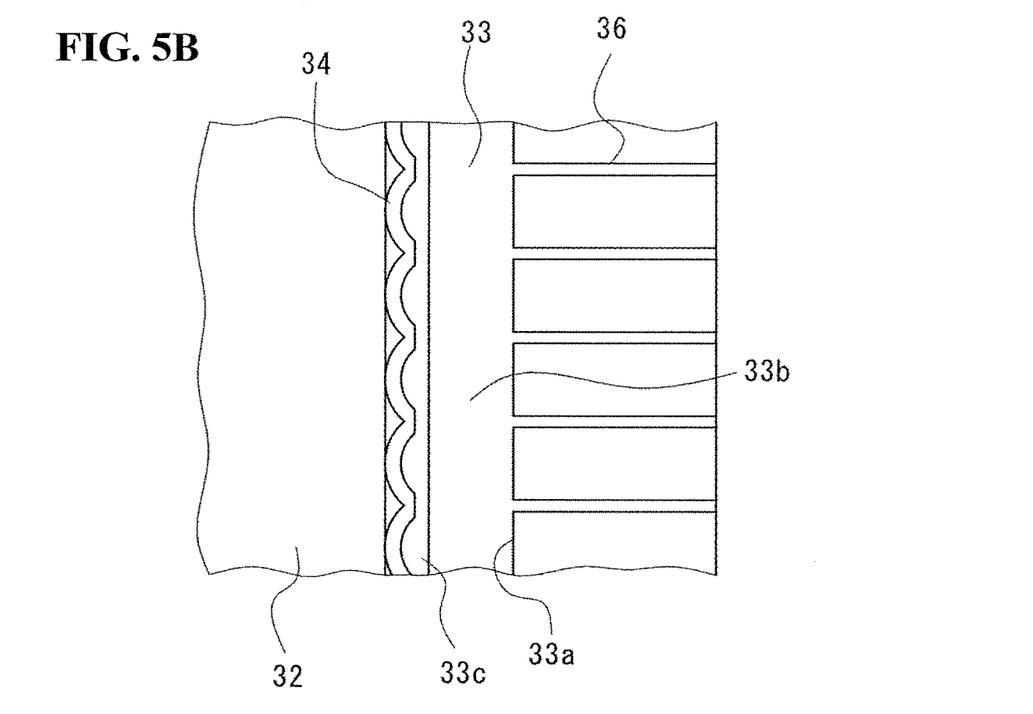
FIG. 5B is a plan view of the transfer member.

The lower mold transfer plate 32 is formed by forming nickel-chrome alloy into a plate shape that is rectangular in a plan view. As shown in FIGS. 5A and 5B, a recess 33 that extends in the width direction is formed on the upper face of the lower mold transfer plate 32. The recess 33 is a space that is surrounded by a vertical face 33a, a bottom face 33b, an inclined face 33c, and two end faces (not shown). Multiple arc-shaped regions 34 are aligned in the width direction on the inclined face 33c, and many protruding portions that are roughly triangular in cross-section extend in the radial direction on the lower halves of the arc-shaped regions 34.

A portion of the melted resin flows into the recess 33 and forms the thick portion 35. The height dimension of the thick portion 35 is formed so as to be in the order of less than a millimeter (here, 0.5 mm). The protrusion dimension (surface roughness) of the protruding portions formed on the inclined face is formed so as to be in the order of microns to less than a micron (here, 2 μm). Regions in which protruding portions are formed are also included on the transfer face and bend light received from the multiple light sources arranged on the end face side of the thick portion 35 in order to prevent light leakage from the inclined face 33c.

Also, multiple groove portions 36 that are continuous from the recess 33 to the exterior are formed on the upper face of the lower mold transfer plate 32. According to one or more embodiments of the present invention, the groove portions 36 are formed in a direction (x axis direction) that is perpendicular to the width direction (y axis direction) in which the recess 33 extends, but they may be formed so as to merely intersect. According to this, the length of the groove portions 36 can be minimized.

Figure 6A:
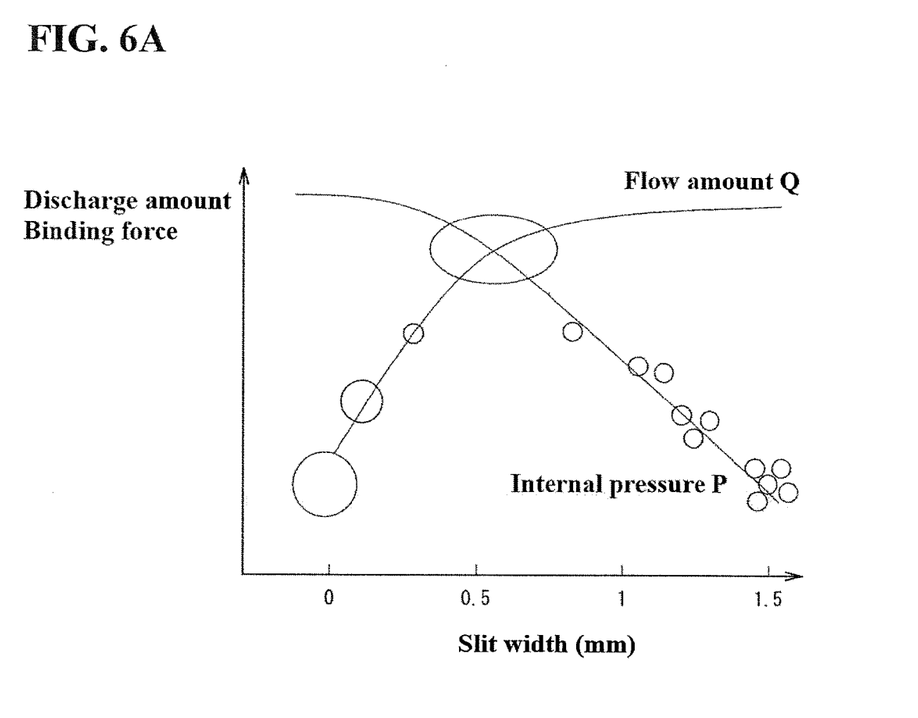
FIG. 6A is a graph showing results of analysis performed for obtaining appropriate slit width dimensions for removing residual air bubbles.
Figure 6B:
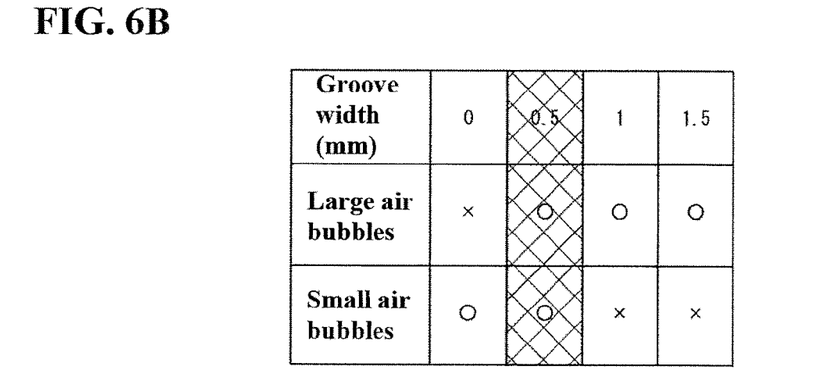
FIG. 6B is an evaluation table.

The groove portions 36 are formed so as to be located between the arc-shaped regions 34. The depth dimension of the groove portions 36 is set to be greater than or equal to the depth dimension of the recess 33 (here, they are set to the same depth). Also, the width dimension of the groove portions 36 is set to a value at which no air bubbles remain in the recess 33 while the outflow amount of the melted resin that flows into the recess 33 is suppressed to the minimum necessary amount. If the width dimension of the groove portion 36 is small, large air bubbles are likely to form, whereas if it is large, many small air bubbles are likely to form. With focus given to this point, a value at which both small and large air bubbles can be effectively removed has been obtained by experimentation. The result is as shown in FIGS. 6A and 6B. When the width dimension of the groove portion 36 is set to 0.5 mm, it is possible to effectively remove both large and small air bubbles.

In this way, according to the lower mold transfer plate 32 with the above-described configuration, the groove portions 36 that are connected from the recess 33 to the exterior are formed at locations that are between and behind the arc-shaped regions 34, and it is thereby possible to smoothly guide air in the recess 33 to the exterior when the melted resin flows into the recess 33. Moreover, a portion of the melted resin that flows into the recess 33 flows outward to the groove portions 36 as well. Furthermore, since the depth dimension of the groove portions 36 is greater than or equal to the depth dimension of the recess 33, no air remains in the regions that lead from the recess 33 to the groove portions 36 (if the depth dimension of the groove portions 36 is smaller than the depth dimension of the recess 33, there is a risk that a corner portion will be formed and air will remain in that corner portion). Accordingly, air will not remain in the recess 33, and no void will appear in the thick portion 35. Also, even if air remains in the recess 33, it will only be a small amount, and therefore the molding resin will not burn, and the resin can be melted without causing voids to form in the melted resin due to the applied pressure.

Operation

Operations performed by the optical member forming apparatus with the above-described configuration will be described next. First, resin pellets are supplied into the main body of the material supply apparatus 18 via the hopper 21, and the supplied resin pellets are melted while the internal screw 22 is caused to rotate. Meanwhile, the lower mold 30 including the lower mold transfer plate 32 placed on the lower mold heating head 31 is moved by the conveyance member 17 and is positioned on the first lower support base 20.

Next, the screw 22 is rotated to supply melted resin in the form of a sheet from the die exit of the T-die 23 while the conveyance member 17 is driven to cause the lower mold 30 to move in the horizontal direction. The supplied melted resin is in a state in which a predetermined region on the upper face of the lower mold transfer plate 32 is coated with the melted resin. Also, the temperature of the lower mold transfer plate 32 is adjusted by the lower mold heating head 31 so as to keep the melted resin in a melted state or in a semi-melted state.

When the supply of the melted resin to the upper face of the lower mold transfer plate 32 is complete, the conveyance member 17 is driven so as to cause the lower mold 30 to move toward the transfer molding apparatus 2. In the transfer molding apparatus 2, the lower mold 30 is positioned at a predetermined position. In the upper mold 27, the upper mold heating head 28 adjusts the temperature of the upper mold transfer plate 29 to a predetermined temperature. Here, the mold is closed by lowering the upper mold 27 so as to come into contact with the lower mold 30. Since the resin supplied by the material supply apparatus 18 is already melted and the temperature of the lower mold 30 and the upper mold 27 has been adjusted to the predetermined temperature, the shapes formed on the upper mold transfer plate 29 and the lower mold transfer plate 32 are smoothly transferred to the melted resin in a short amount of time. At this time, the amount of resin in the recess 33 increases compared to other portions and air bubbles are easily formed, but the groove portions 36 are in communication with the recess 33, and thus the formed air bubbles are discharged via the groove portions 36 toward the exterior of the metallic mold. Also, since the air is not compressed in the recess 33, according to one or more embodiments of the present invention, problems such as burning may not occur. Furthermore, even if a miniscule quantity of air remains in the recess 33, since sufficient pressure is applied, it is possible to melt the resin without causing voids in the melted resin to be formed.

When transfer molding is performed in this way, the upper and lower heating heads cause the upper and lower transfer plates to cool. At this time, the pressure applied by closing the mold decreases in a step-wise manner as the transfer plates are gradually cooled to a predetermined temperature. Then, when the resin solidifies, the mold is opened, and a light guide plate that is the mold product is retrieved by a robot arm or the like.

In this way, since the resin is cooled while the pressure applied by closing the mold is gradually reduced, residual stress is not likely to remain in the mold product. Accordingly, deformation such as warping will not occur at a later time in the mold product.

Note that the present invention is not limited to the above embodiments, and various modifications are possible.

For example, the groove portions 11 and 36 that are formed on the first transfer roller 8 and the lower mold transfer plate 32 can have the following configuration.

Figure 7A:
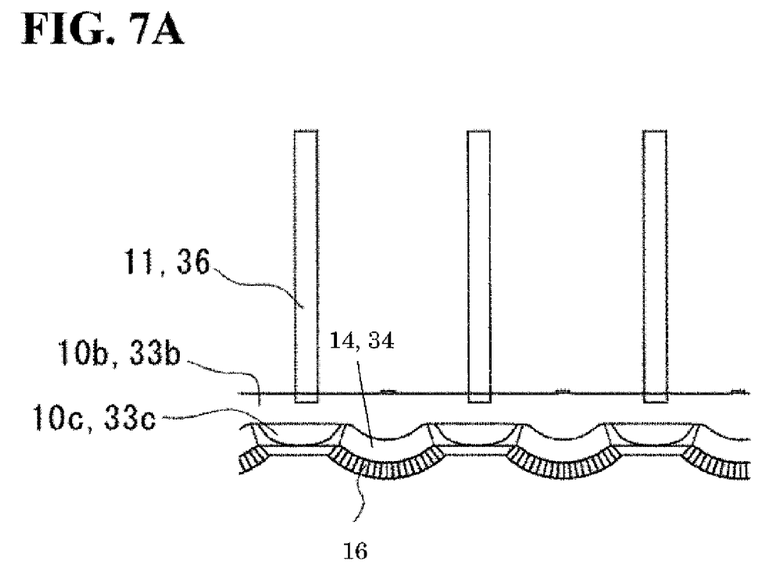
FIG. 7A is a partial plan view showing a first modified example of the first and second embodiments.
Figure 7B:
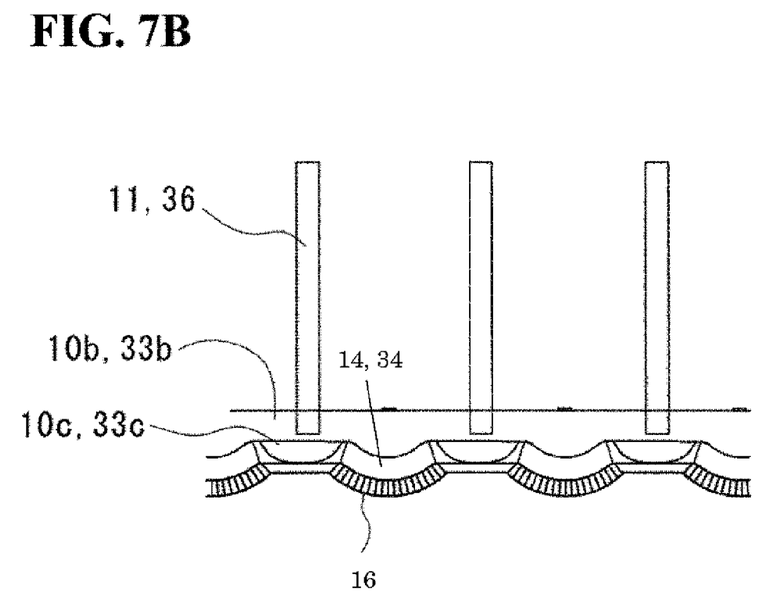
FIG. 7B is a partial plan view showing a second modified example of the first and second embodiments.

That is to say, as shown in FIGS. 7A and 7B, the groove portions 11 and 36 may be extended so as to cut into the recesses 10 and 33 for forming the thick portions 15 and 35.

Figure 8A:
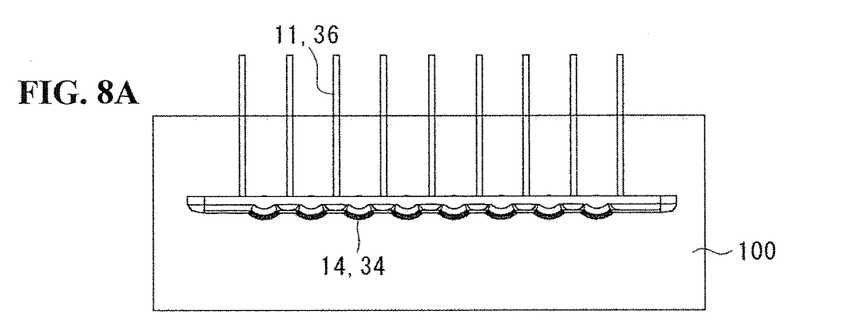
FIG. 8A is a partial plan view showing a third modified example of the first and second embodiments.
Figure 8B:
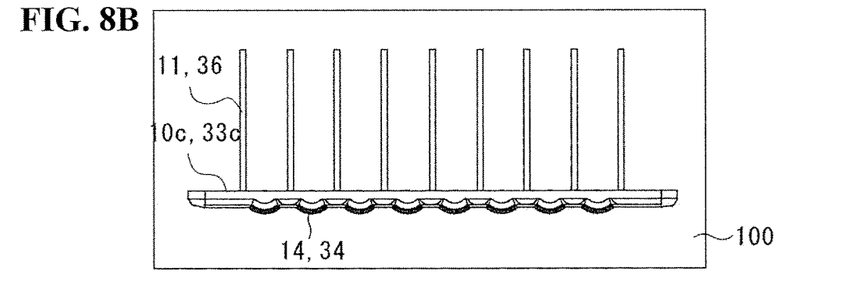
FIG. 8B is a partial plan view showing a fourth modified example of the first and second embodiments.
Figure 8C:
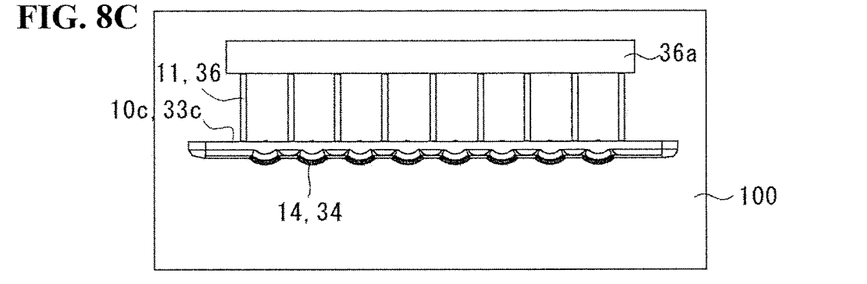
FIG. 8C is a partial plan view showing a fifth modified example of the first and second embodiments.
Figure 8D:
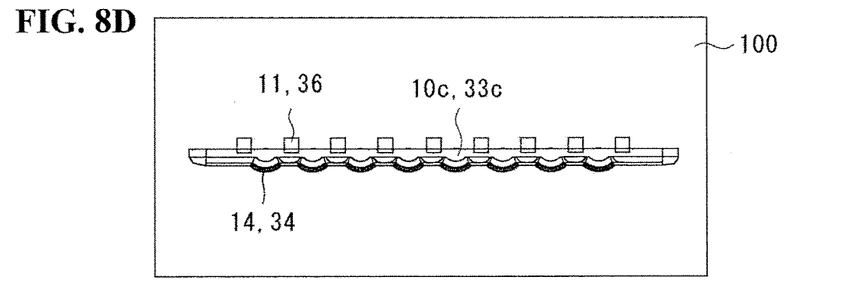
FIG. 8D is a partial plan view showing a sixth modified example of the first and second embodiments.

The groove portions 11 and 36 may also have the configurations shown in FIGS. 8A to 8D. In FIG. 8A, the leading ends of the groove portions 11 and 36 extend to the exterior side of the sheet-shaped resin. In FIG. 8B, the leading ends of the groove portions 11 and 36 are arranged within the sheet-shaped resin. In FIG. 8C, a supplementary groove portion 36a for accumulating air bubbles is provided on the leading end of the groove portions 11 and 36. In FIG. 8D, the groove portions 11 and 36 are formed with large widths.

The groove portions 11 and 36 need not have the same pitch, and the pitch may be varied as appropriate. The groove portions 11 and 36 need not have the same width dimensions or the same depth dimensions, and they may have width dimensions and depth dimensions that diverge. It is sufficient that the cross-sectional area of the flow paths of the groove portions 11 and 36 increases or decreases uniformly, or alternatively, they may repeatedly increase and decrease. The groove portions 11 and 36 need not be linear, and may be curved or winding. Adjacent groove portions 11 and 36 need not be parallel, and the depth directions need not be the same. In particular, the extension directions of the groove portions 11 and 36 do not necessarily need to be parallel to the direction of light incidence, even in the case where the mold product is to be used as a light guide plate. The groove portions 11 and 36 may be formed so as to be directly connected along the recess 10. The groove portions 11 and 36 may be formed away from the recess 10 so as to be connected thereto by at least one groove portion among the groove portions 11 and 36. The groove portions 11 and 36 may be configured so as to have a combination of these shapes according to necessity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A metallic mold structure comprising:
a transfer molding unit that performs transfer molding on front and rear surfaces of resin that has been melted and supplied to the transfer molding unit,
wherein the transfer molding unit includes:
a cylindrical first transfer member that performs transfer molding on the front surface of the resin; and
a cylindrical second transfer member that performs transfer molding on the rear surface of the resin, and
wherein at least one of the first and second transfer members rotates in a first circumferential direction, and includes:
a recess formed on a transfer face; and
at least one groove portion that is connected to the recess,
wherein the recess extends in a second direction perpendicular to the first circumferential direction such that the recess is longer in the second direction than the first circumferential direction,
wherein the at least one groove portion extends in the first circumferential direction such that the at least one groove portion is longer in the first circumferential direction than the second direction,
wherein the recess is configured to remove air from the recess as the resin is fed into the recess, and
wherein the recess is surrounded by a vertical face, a bottom face, and an inclined face, and a plurality of arc-shaped regions are on the inclined face, and a plurality of protruding portions extend in a radial direction on lower halves of the arc-shaped regions.

2. The metallic mold structure according to claim 1,
wherein the groove portion has a depth that is greater than or equal to the depth of the recess.

3. The metallic mold structure according to claim 1,
wherein the at least one of the first and second transfer member has a supplementary groove portion that is formed along one end of the at least one groove portion so as to be in communication with the recess, and
wherein the supplementary groove portion is connected to the recess via the at least one groove portion.

4. The metallic mold structure according to claim 1,
wherein the first transfer member is constituted by a first transfer roller that can be driven so as to rotate and is arranged at a predetermined interval from a guide roller, and the second transfer member is constituted by a second transfer roller that is arranged at a predetermined interval from the first transfer roller and can be driven so as to rotate.

5. A transfer molding apparatus including the metallic mold structure according to claim 1.

6. The metallic mold structure according to claim 2,
wherein the at least one of the first and second transfer member has a supplementary groove portion that is formed along one end of the at least one groove portion so as to be in communication with the recess, and
wherein the supplementary groove portion is connected to the recess via the at least one groove portion.

7. The metallic mold structure according to claim 2,
wherein the first transfer member is constituted by a first transfer roller that can be driven so as to rotate and is arranged at a predetermined interval from a guide roller, and the second transfer member is constituted by a second transfer roller that is arranged at a predetermined interval from the first transfer roller and can be driven so as to rotate.

8. The metallic mold structure according to claim 3,
wherein the first transfer member is constituted by a first transfer roller that can be driven so as to rotate and is arranged at a predetermined interval from a guide roller, and the second transfer member is constituted by a second transfer roller that is arranged at a predetermined interval from the first transfer roller and can be driven so as to rotate.

9. A transfer molding method comprising:
supplying melted resin to a cylindrical first metallic mold that rotates in a first circumferential direction;
disposing the first metallic mold onto which the resin was supplied to a position opposing a cylindrical second metallic mold, wherein at least one of the first and second metallic molds comprises a recess extending in a second direction perpendicular to the first circumferential direction such that the recess is longer in the second direction than the first circumferential direction;
performing transfer molding by sandwiching the resin between the first and second metallic molds; and
wherein, the performing transfer molding comprises discharging residual air that remains in the recess via a groove portion that extends in the first circumferential direction such that the groove portion is longer in the first circumferential direction than the second direction, and
wherein the recess is surrounded by a vertical face, a bottom face, and an inclined face, and a plurality of arc-shaped regions are on the inclined face, and a plurality of protruding portions extend in a radial direction on lower halves of the arc-shaped regions.

10. The transfer molding method according to claim 9, wherein the groove portion has a depth that is greater than or equal to the depth of the recess.

11. The transfer molding method according to claim 9, wherein the performing transfer molding comprises flowing a portion of the melted resin out to a groove portion for molding a non-product portion.

12. The transfer molding method according to claim 10, wherein the performing transfer molding comprises flowing a portion of the melted resin out to a groove portion for molding a non-product portion.

* * * * *